(12) United States Patent
Kokonaski et al.

(10) Patent No.: US 6,390,623 B1
(45) Date of Patent: May 21, 2002

(54) CUSTOMIZED PROGRESSIVE ADDITION LENSES

(75) Inventors: William Kokonaski; Edgar Menezes, both of Roanoke, VA (US); Daniel Katzman, ELA (IL); Amitava Gupta, Roanoke, VA (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/535,791

(22) Filed: Mar. 29, 2000

(51) Int. Cl.[7] ............................. G02C 7/06; G02C 7/02
(52) U.S. Cl. ..................... 351/169; 351/176; 351/177
(58) Field of Search ........................ 351/169, 177, 351/168, 170–172

(56) References Cited

U.S. PATENT DOCUMENTS

| | | | | |
|---|---|---|---|---|
| 4,690,524 A | | 9/1987 | Daniels | 351/168 |
| 4,762,408 A | | 8/1988 | Shinohara | 351/169 |
| 5,123,725 A | * | 6/1992 | Winthrop | 351/169 |
| 5,777,716 A | * | 7/1998 | Miura | 351/169 |
| 5,790,226 A | | 8/1998 | Pollak | 351/54 |
| 5,864,380 A | * | 1/1999 | Umeda | 351/169 |
| 5,886,766 A | * | 3/1999 | Kaga et al. | 351/169 |
| 5,892,565 A | | 4/1999 | Ueno et al. | 351/169 |
| 5,949,519 A | * | 9/1999 | Le Saux et al. | 351/169 |
| 6,074,062 A | * | 6/2000 | Morris et al. | 351/169 |

FOREIGN PATENT DOCUMENTS

| | | |
|---|---|---|
| EP | 911670 | 4/1999 |
| EP | 911671 | 4/1999 |

* cited by examiner

Primary Examiner—Jordan M. Schwartz
(74) Attorney, Agent, or Firm—Lois Gianneschi

(57) ABSTRACT

The invention provides progressive addition lenses designed for uses in which a large region of intermediate refractive power is desirable. The enlarged intermediate region is provided without partial or complete elimination of the distance vision zone.

8 Claims, 7 Drawing Sheets

CUSTOMIZED PROGRESSIVE ADDITION LENSES

FIELD OF THE INVENTION

The present invention relates to multifocal ophthalmic lenses. In particular, the invention provides progressive addition lenses designed for uses in which a large region of intermediate refractive power is desirable.

BACKGROUND OF THE INVENTION

The use of ophthalmic lenses for the correction of ametropia is well known. For example, multifocal lenses, such as progressive addition lenses ("PAL's"), are used for the treatment of presbyopia. The surface of a PAL provides far, intermediate, and near vision zones in a gradual, continuous progression of vertically increasing dioptric power from far to near focus, or top to bottom of the lens. PAL's are appealing to the wearer because PAL's are free of the visible ledges between the zones of differing dioptric power that are found in other multifocal lenses, such as bifocals and trifocals.

A number of activities require an especially large intermediate refractive power zone, which the typical PAL does not contain. For example, in viewing an image screen, such as a computer screen, an enlarged intermediate vision zone is desirable to avoid the need for the lens wearer to move the head from side to side to view the screen. Several customized, multifocal lens designs are known that provide an enlarged intermediate vision zone. However, these designs completely or partially sacrifice the far vision zone in order to provide the enlarged intermediate vision zone. Additionally, the intermediate vision zone of these designs is at least partially above the 0–180 degree axis of the lens causing the lens wearer to have to tilt the head forward in order to use this zone in visualizing an image screen.

Other designs, such as disclosed in U.S. Pat. No. 4,762,408, provide a wider intermediate vision zone, but only by increasing the channel length to 20 mm or more and by placing the near vision zone optical center at a point that does not permit the lens wearer's pupil to access it without discomfort or head movement. Thus, a need exists for a PAL that overcomes some of the problems of these known designs.

DESCRIPTION OF THE INVENTION AND ITS PREFERRED EMBODIMENTS

Figure 1:
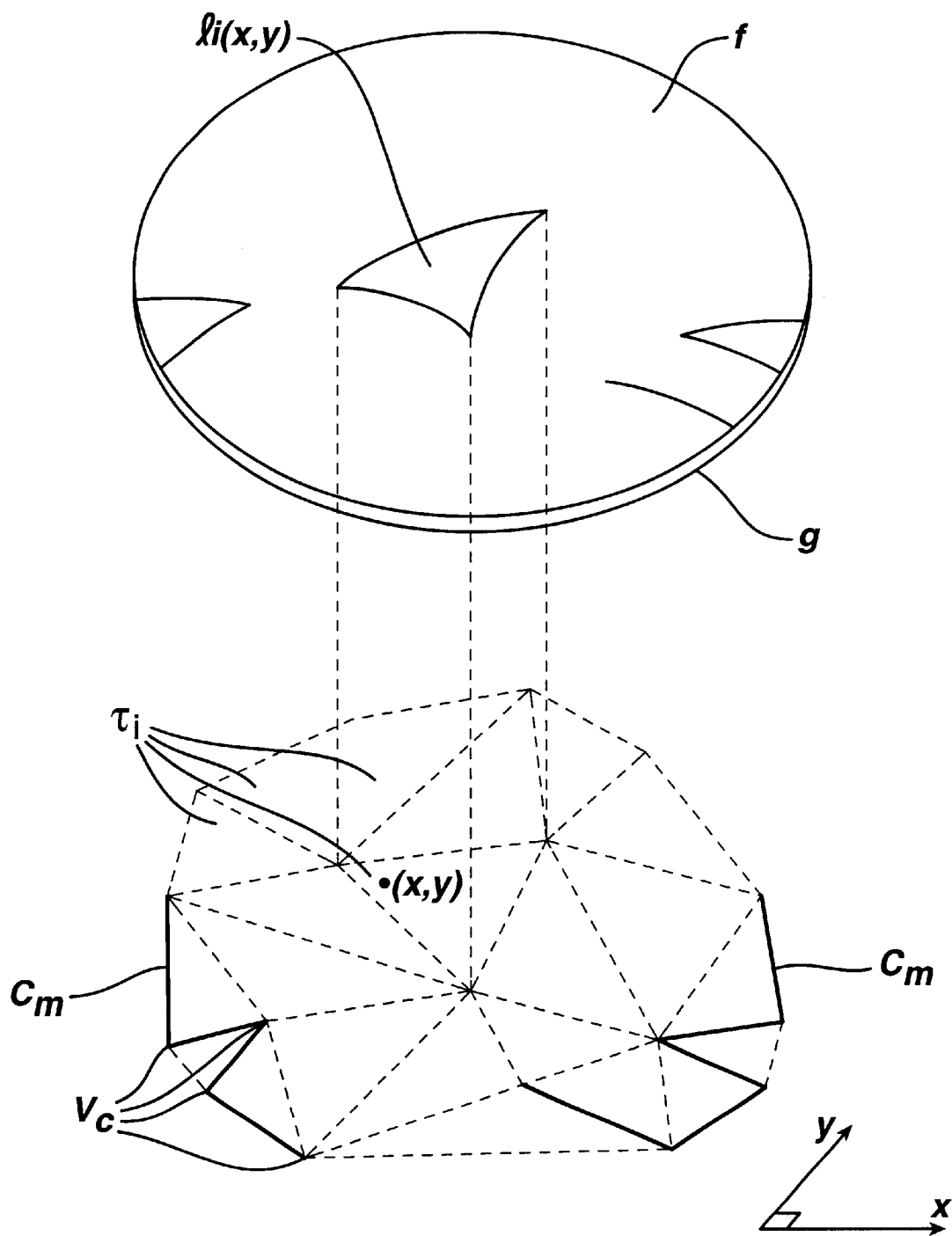
FIG. 1 is a schematic illustration of a lens surface.

The present invention provides progressive addition lenses, as well as methods for their design and production, in which a widened intermediate vision zone, or channel, is provided. This enlarged zone is provided without either partial or complete elimination of the distance, or far, vision zone. Additionally, the channel length of the lens of the invention is maintained at about 19 mm or less and the maximum unwanted astigmatism of the lens is less than about 80 percent, preferably about 40 to about 80, more preferably about 50 to abut 50 percent, of the lens' dioptric add power.

For purposes of the invention, by "lens" or "lenses" is meant any ophthalmic lens including, without limitation, spectacle lenses, contact lenses, intraocular lenses and the like. Preferably, the lens of the invention is a spectacle lens. By "intermediate vision zone" or "channel" is meant the zone of increasing dioptric power that is free of unwanted astigmatism of about 0.75 diopters or greater and which connects the far vision zone with the near vision zone. By "unwanted astigmatism" is meant astigmatism introduced or caused by one or more of the lens' surfaces. By "dioptric add power" is meant the amount of dioptric power difference between the near and far vision zones of a progressive addition surface.

It is a discovery of the invention that a widened channel may be provided while maintaining the far and near vision zones intact by selection of a certain lens design method and channel power gradient. Specifically, a lens design method in which the entire lens surface is optimized as a whole is used along with a channel power gradient of less than or equal to about 0.12 diopters/mm. For purposes of the disclosure of this invention, optical parameters, including sphere power and astigmatism are measured by means of an eye point analysis protocol placing the vertex point 27 mm behind the anterior surface of the optic and utilizing a sag point file to represent each surface geometry of the optic. The eye point analysis of the overall lens optic may then be performed by ray tracing.

In one embodiment, the invention provides a progressive addition lens comprising, consisting essentially of, and consisting of at least one surface comprising, consisting essentially of, and consisting of a far vision zone, a near vision zone, and a channel, the channel having a length of about 19 mm or less, wherein the widths of the far vision zone is about equal to or greater in width than that of the intermediate zone and the width of the intermediate vision zone is about equal to or greater than that of the near vision zone and wherein the lens has a maximum, unwanted astigmatism of less than about 80 percent, preferably about 40 to about 80 percent, more preferably about 50 to about 60 percent, of the dioptric add power. The lenses of the invention may have one or more than one progressive surface.

In another embodiment, the invention provides a method comprising, consisting essentially of, and consisting of the step of designing a lens having at least one progressive surface and wherein the entire progressive surface is optimized as a whole and a channel power gradient of about 0.12 diopters/mm or less is used.

Any design method in which the lens surface is optimized as a whole may be used in designing the lens of the invention. The channel gradient to be utilized is specified prior to the start of the optimization process. An example of a suitable lens design method in which the progressive surface is optimized as a whole is disclosed in U.S. Pat. No. 5,886,766. Referring to FIG. 1, an alternative and preferable method used is one in which a lens is considered as having surface g and unknown surface f. The lens surface f is considered over a region D in the (x, y) plane, which region is partitioned into a collection of polygons, preferably triangles $\tau_i$, i=1, . . . , N, where N is the total number of triangles. The number of polygons, or triangles, is not limited and they need not be identical to one another.

Surface f is a plurality of lenslets $l_i$, each lenslet $l$, being defined over one polygon or triangle. The height of the surface f above the point (x, y) in the polygon is given by $l_i$ (x, y) expressed as:

$$f(x, y) = l_i(x, y), (x, y) \in \tau_i$$

The surface of each lenslet is represented by a fifth order polynomial, namely a polynomial in x and y that includes all combinations of the form $x^j y^m$ with j+m less than or equal to 5. The height of the surface of a lenslet, above the point (x, y) in the polygon is given by $l_i$ (x, y) in the equation:

$$l_i(x, y) = \sum_{\substack{j,m \\ j+m \leq 5}} a_i^{jm} x^j y^m, (x, y) \in \tau_i, \quad (A)$$

wherein $a_i^{jm}$ are the coefficients of the ith lenslet $l_i$. The surface f is therefore fully determined by the coefficients of the set of local polynomials.

In this preferred method, it is sufficient to require that the lenslet surfaces are patched together so that the resulting surface is continuous and differentiably continuous along the boundaries of the polygons as expressed by the following equations:

$$\frac{\partial l_i(x, y)}{\partial x} = \frac{\partial l_j(x, y)}{\partial x}, \quad (x, y) \in \tau_i \cap \tau_j \quad (B)$$

$$\frac{\partial l_i(x, y)}{\partial y} = \frac{\partial l_j(x, y)}{\partial y}, \quad (x, y) \in \tau_i \cap \tau_j \quad (D)$$

wherein the intersection of the polygons $\tau_i$ and $\tau_j$ is the boundary common to both. Alternatively, the lenslet surfaces may be patched together so that the resulting surface is twice differentiably continuous at the of triangles $\tau_I$ as expressed in the following equations:

$$\frac{\partial^2 l_i(x, y)}{\partial x^2} = \frac{\partial^2 l_j(x, y)}{\partial x^2} = \frac{\partial^2 l_k(x, y)}{\partial x^2}, \quad (x, y) \in \tau_i \cap \tau_j \cap \tau_k, \quad (E)$$

$$\frac{\partial^2 l_i(x, y)}{\partial x \partial y} = \frac{\partial^2 l_j(x, y)}{\partial x \partial y} = \frac{\partial^2 l_k(x, y)}{\partial x \partial y}, \quad (x, y) \in \tau_i \cap \tau_j \cap \tau_k, \quad (F)$$

$$\frac{\partial^2 l_i(x, y)}{\partial y^2} = \frac{\partial^2 l_j(x, y)}{\partial y^2} = \frac{\partial^2 l_k(x, y)}{\partial y^2}, \quad (x, y) \in \tau_i \cap \tau_j \cap \tau_k, \quad (G)$$

wherein the intersection of the triangles $\tau_i$, $\tau_j$, and $\tau_k$ is the vertex common to the triangles.

Preferably, specific areas of the lens surface are emphasized by choosing weight coefficients $w_{i,1}$ and $w_{i,2}$ characterizing the relative strength of each lenslet and the relative importance of the astigmatism and the optical power of each lenslet. Therefore, subject to the constraints of Equations B through G, the coefficients representing the surface must minimize a cost function E given by the equation:

$$E = \sum_{i=1}^{N} \int_i \left\{ w_{i,1} (\kappa_1(x, y) - \kappa_2(x, y))^2 + w_{i,2} \left( \frac{\kappa_1(x, y) + \kappa_2(x, y)}{2} - P(x, y) \right)^2 \right\} dx dy, \quad (H)$$

wherein $\kappa_1(x, y)$ and $\kappa_2(x, y)$ are the principal curvatures of the surface f at (x, y) and dxdy is a surface area element of $\tau_i$. The predetermined weight coefficients $w_{i,1}$ and $w_{i,2}$ depend upon x and y and possibly f and first derivatives of f.

The surface that minimizes the cost function will not necessarily have the optical power P(x, y) at the point (x, y) and the designer may force the lens to have a particular shape, optical behavior, or both a finite set of curves $C_m$, m=1, ..., $N_c$ wherein $N_c$ is the total number of curves, along a subset of the boundaries of $\tau_i$. The curve conditions are specified controlling the shape and optical properties at the vertices $V_c$ and in the vicinity of the curves $C_m I$.

The surface may, and preferably is, expressed as a patch of fifth-order polynomials defined over the triangles $\tau_i$, such that the surface will satisfy the continuity constraints of Equations (B)–(G) according to the technique described in Argyis, J. H. et al., *The TUBA Family of Plate Elements for the Matrix Displacement Method*, Aeronautical J., vol. 732, 701–709, incorporated in its entirety herein by reference. A number $N_s$ of fifth order polynomials $S_k(x, y)$ that satisfy the continuity constraints of Equations (B)–(G) are constructed. The surface is represented as a linear combination of these shape polynomials as given by the equation:

$$f(x, y) = \sum_{k=1}^{Ns} d_k s_k(x, y) \quad (I)$$

wherein $d_k$ are the unknown coefficients in the linear combination. By construction, the surface of this satisfies the continuity constraints of Equation (B)–(G). When the surface of Equation (I) is substituted into the cost function of Equation (H), the result is an expression of the cost function in terms of the coefficients $d_k$. The minimization of the cost function may now be performed without regard to the continuity constraints of Equations (B)–(G) and the curve constraints to determine the remaining unknown coefficients.

As disclosed in the Argyis et al. article, the continuity constraints of Equation (B)–(G) are equivalent to satisfying continuity of f, its first derivatives and its second derivatives at the vertices of the triangles $\tau_i$, and continuity of the derivative of f with respect to the normal at the midpoints of the sides of the triangles. For the entire set of triangles, the continuity constraints of Equations (B)–(G) are equivalent to (H) continuity constraints at each vertex and 1 continuity constraint for each midpoint. The exact values off its first derivatives and its second derivatives at the vertices along with the exact value of f with respect to the normal at each midpoint are free parameters, or degrees of freedom.

A shape polynomial $S_k(x, y)$ is constructed for each degree of freedom. For example, for a triangle $\tau_1$ there are vertices V1, V2 and V3 and midpoints M1, M2, and M3. A second triangle $\tau_2$ has vertices V1, V2, and V4 and midpoints M1, M4, and M5. Vertex V1 is common to six triangles $\tau_1$–$\tau_6$, midpoint M1 is common to $\tau_1$ and $\tau_2$, midpoint M2 is common to $\tau_1$ and $Y_7$, and midpoint M3 is common to $\tau_1$ and $\tau_6$.

One of the degrees of freedom is related to the value of the surface f at the vertex V1. A shape polynomial is constructed so that its value at vertex V1 is 1 and at every other vertex in the set of triangles is 0, its first and second derivatives at every vertex are 0, and at its derivatives with respect to the normal at every midpoint is 0. This is accomplished by determining a fifth order polynomial in each triangle and setting the shape polynomial to be the piece-wise collection of these fifth order polynomials. The fifth order polynomials for triangles $t_1$ and $t_2$ satisfy the continuity constraints of Equations (B)–(G). Similar fifth order polynomials in x and y are determined for the remaining triangles in the set and the shape polynomial is defined as the piece-wise collection of these fifth order polynomials.

A second shape polynomial is constructed so that its value at every vertex is 0. its first derivative at vertex V1 is 1 and at every other vertex is 0, its second derivatives at every other vertex are 0, and its derivative with respect to the normal at every midpoint is 0. It will be appreciated that each of the shape polynomials satisfies the continuity constraints of Equations (B)–(G) by construction and, therefore, the linear combination given in Equation (I) satisfies them as well. It will also be appreciated that each of the fifth order shape polynomials is non-zero only in those triangles in which a degree of freedom is 1 at a vertex or midpoint of that triangle.

The curve constraints specified by the designer are prescribed values for f and possibly some of its first and second derivatives at the vertices $V_c$ of the curves $C_m$. Each of the curve constraints fixes the value for f or one of its first or second derivatives at a particular vertex in the set of triangles, and therefore fully determines the value of a particular unknown coefficient appearing in the linear combination of Equation (I). The number of coefficients that remain unknown is given by the expression $N_s$–number of curve constraints.

Other techniques for constructing fifth order shape polynomials that satisfy the continuity constraints of Equations (B)–(G) are know from the art of plate mechanics. If polygons other than triangles are used to partition the region D, the number of degrees of freedom associated with the polygon will be greater than 21, and therefore, the polynomials will have to be higher than fifth order in order to account for all of the degrees of freedom.

The linear combination of Equation (I) is substituted into the cost function of Equation 6 and the result is an expression of the cost function in terms of the coefficients, some of which are unknown. The minimization of the cost function is now performed without regard for the continuity constraints of Equations (B)–(G) and the curve constraints in order to determine the remaining unknown coefficients. It is well known from the calculus variations that the minimization problem is equivalent to solving a particular equation, the Euler-Lagrange equation, for the unknown surface f.

For the cost function given in Equation (H), the Euler-Lagrange equation is nonlinear. Furthermore, the integral over the triangle $\tau_i$ contains a nonlinear expression in the unknown coefficients and, therefore, is difficult to compute. Thus, any suitable iterative method may be used to solve the Euler-Lagrange equation for the unknown coefficients. Preferably, the Newton method is used.

The iterative method produces a sequence of surfaces such that the sequence converges to the required solution f. There are many ways to choose the initial surface for the iteration, for example a plane in x and y can be chosen for the initial surface. Each surface in the sequence solves a system of linear algebraic equations, the system characterized by a matrix. The construction of the matrices appearing in the iteration method is described in the known finite elements literature.

Because there are infinitely many steps to the iteration process, it is necessary to determine a criterion for stopping the iteration process at a particular point. For example, a surface $f_m$ may be compared to the previous surface $f_{m-1}$. One example of such a comparison is to take the difference of the linear combination coefficients for surfaces $f_m$ and $f_{m-1}$. If the sum of the squares of this difference is less than a predetermined threshold, then the sequence is said to have converged to the surface $f_m$. In the lens of the invention, the stopping criteria are derived from the design in which is desired that the far vision zone width is about equal to or greater than that of the intermediate zone and the width of the intermediate zone is about equal to or greater than that of the near vision zone.

If the convergence to a solution is too slow, according to a preferred embodiment, the convergence of the sequence of surfaces may be enhanced by replacing the cost function given in Equation (H) by a variant cost function for one or more steps in the iteration, before returning to the original problem. The variant cost function is the cost function of Equation (H) with the principal curvatures $\kappa'_1$ and $\kappa'_2$ as given by:

$$H'(\beta) = \frac{1}{2} \frac{\left(1+\beta\left(\frac{\partial f}{\partial x}\right)^2\right)\left(\frac{\partial^2 f}{\partial y^2}\right) - 2\beta\left(\frac{\partial f}{\partial x}\right)\left(\frac{\partial f}{\partial y}\right)\left(\frac{\partial^2 f}{\partial x \partial y}\right) + \left(1+\beta\left(\frac{\partial f}{\partial y}\right)^2\right)\left(\frac{\partial^2 f}{\partial x^2}\right)}{\left(1+\beta\left(\frac{\partial f}{\partial x}\right)^2 + \beta\left(\frac{\partial f}{\partial y}\right)^2\right)^{3/2}},$$

$$G'(\beta) = \frac{1}{2} \frac{\left(\frac{\partial^2 f}{\partial x^2}\right)\left(\frac{\partial^2 f}{\partial y^2}\right) - \left(\frac{\partial^2 f}{\partial x \partial y}\right)^2}{\left(1+\beta\left(\frac{\partial f}{\partial x}\right)^2 + \beta\left(\frac{\partial f}{\partial y}\right)^2\right)^2},$$

$$\kappa'_1(\beta) = H'(\beta) + \sqrt{H'(\beta)^2 - G'(\beta)},$$

$$\kappa'_2(\beta) = H'(\beta) - \sqrt{H'(\beta)^2 - G'(\beta)},$$

In the case in which $\beta$ has the value 1, the variant cost function is identical to the cost function of Equation (H). When $\beta$ is 0, the variant cost function is a linearization of the cost function given in Equation (H). The convergence of the sequence of surfaces may be enhanced by using the variant cost function in cases in which $\beta$ is between 0 and 1, including 0 but excluding 1, for one or more steps in the iteration before returning to the original problem. The surface properties of the calculated surfaces are checked by simulating, by any known method, the optical properties of the lens as seen from an eye.

In the lenses of the invention, the distance vision dioptric power of the lenses of the invention is about −6.00 to about +6.00 diopters, with the width of the distance vision zone being about 5 to about 30 mm measured along a horizontal axis drawn through the fitting point. By "fitting point" is meant the point on a lens aligned with the wearer's pupil in its distance viewing position when the wearer is looking straight ahead, at which point the lens correction is that needed to correct the wearer's distance vision acuity. The dioptric add power is about +1.00 to about +3.50 diopters, preferably about +1.00 to about +3.00 diopters, the near vision zone width about 5 to about 15 mm. One or more of the surfaces of the lens each may contain spherical power, cylinder power and axis, or combinations thereof Preferably, the widths of the distance, near and intermediate vision zones are about equal or the width of the distance zone is greater than that of the intermediate zone which in turn is greater than that of the near vision zone. These widths may be ensured by specifying, when optimizing total astigmatism, the weights to specific cells bordering the viewing zones.

The lenses of the invention may be fabricated by any convenient means and constructed of any known material suitable for production of ophthalmic lenses. Suitable materials include, without limitation, polycarbonate, allyl diglycol, polymethacrylate, and the like. Such materials are either commercially available or methods for their production are known. Further, the lenses may be produced by any conventional lens fabrication technique including, without limitation grinding, whole lens casting, molding, thermoforming, laminating, surface casting, or combinations thereof. Casting may be carried out by any means, but preferably is performed by surface casting including, without limitation, as disclosed in U.S. Pat. Nos. 5,147,585, 5,178,800, 5,219,497, 5,316,702, 5,358,672, 5,480,600, 5,512,371, 5,531,940, 5,702,819, and 5,793,465 incorporated herein in their entireties by reference. Preferred methods are disclosed in U.S. applications Ser. Nos. 09/178,471 and 09/315,477 incorporated in their entireties herein by reference.

The invention will be clarified further by the following, non-limiting examples.

EXAMPLES

Example 1

Figure 2:
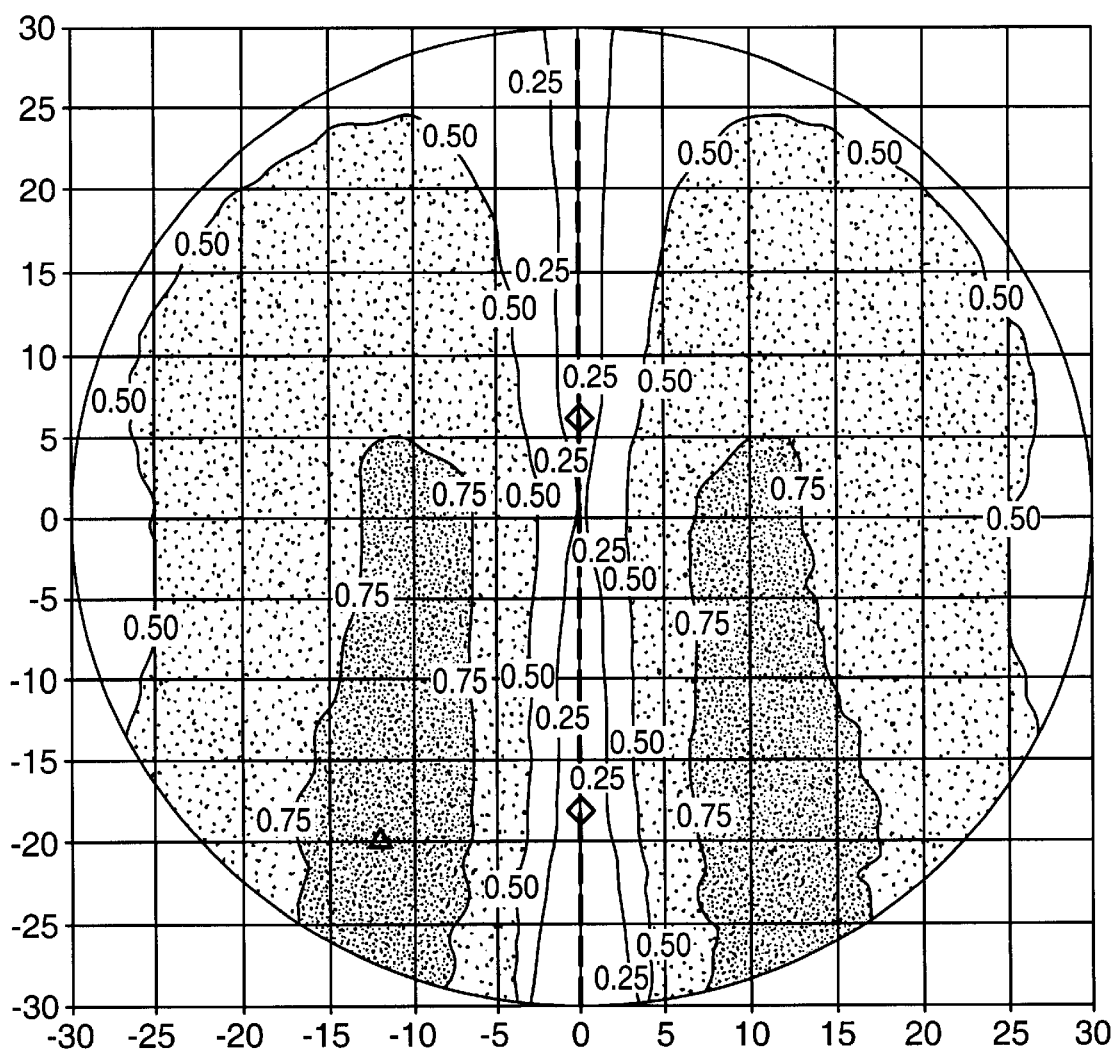
FIG. 2 is an isocylinder map of the lens of Example 1.
Figure 3:
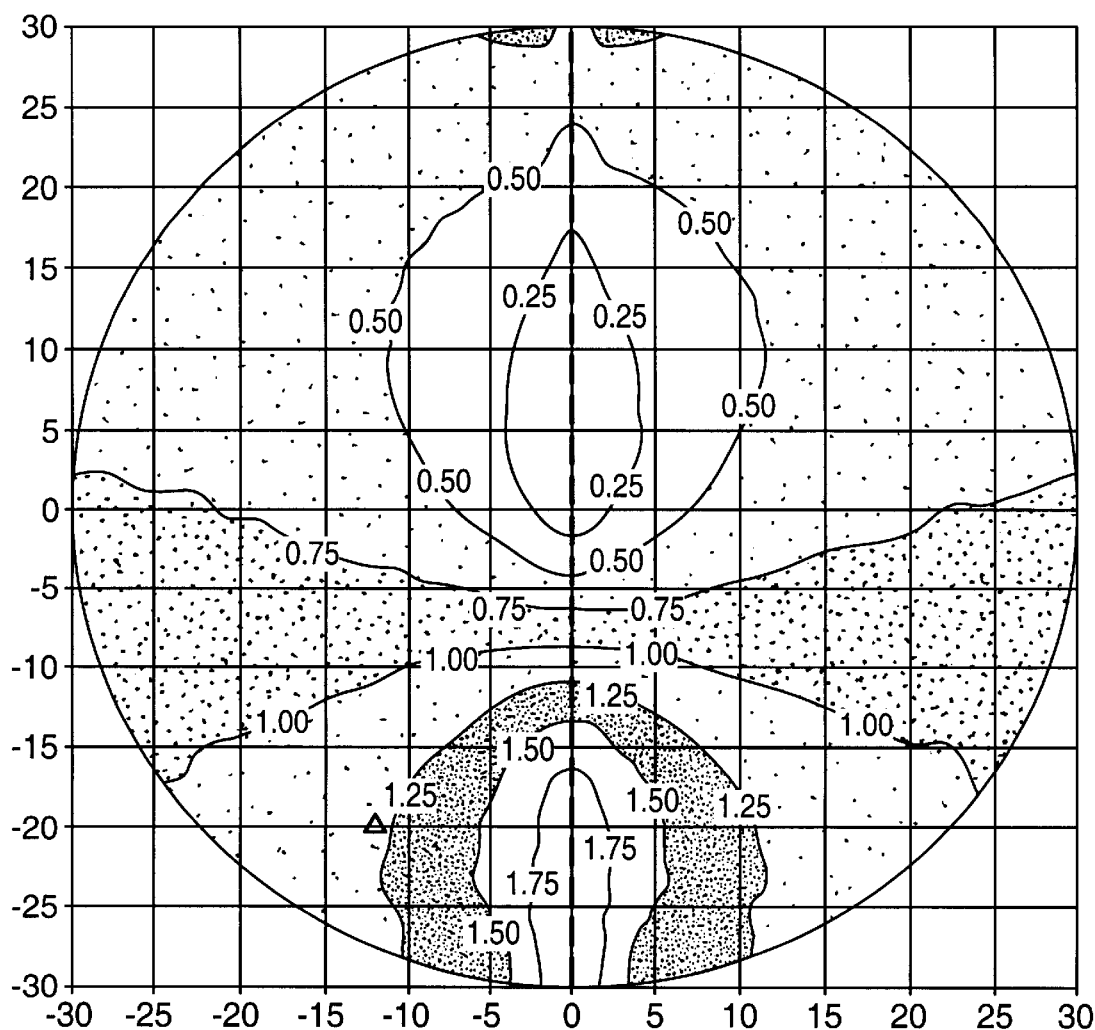
FIG. 3 is a contour map of the lens of Example 1.

A lens of the invention is provided with the characteristics shown on Table 1 and the isocylinder and power maps for the lens are shown in FIGS. 2 and 3, respectively. The nominal add power provided by the lens is 2.00 diopters. As can be seen, the lower dioptric powers of the channel, 0 to 1.25 diopters, occupy a broad zone in the lens, from y=0 to approximately y=−12 mm. The lens is optimized for a working distance of 40 to 80 cm, which distance is typical for computer screen viewers. The design of the lens was carried out using the algorithm specifically disclosed hereinabove. The channel length was adjusted by providing the channel power gradient as an additional input to the algorithm and was specified as 0.11 diopters/mm. The channel length was specified as 18 mm, the distance vision zone width as 20 mm, and the near vision zone width as 14 mm.

Example 2

Figure 4:
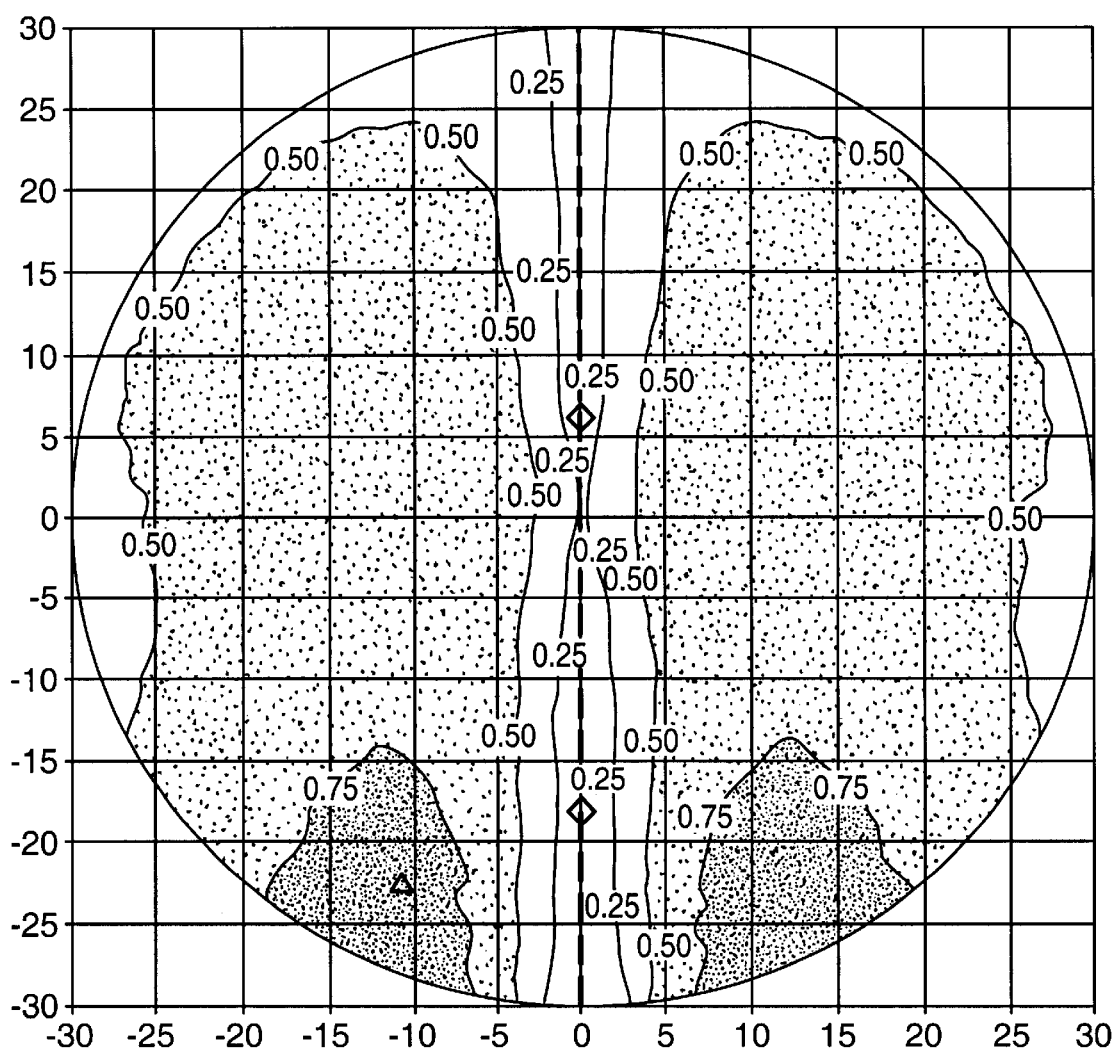
FIG. 4 is an isocylinder map of the lens of Example 2.
Figure 5:
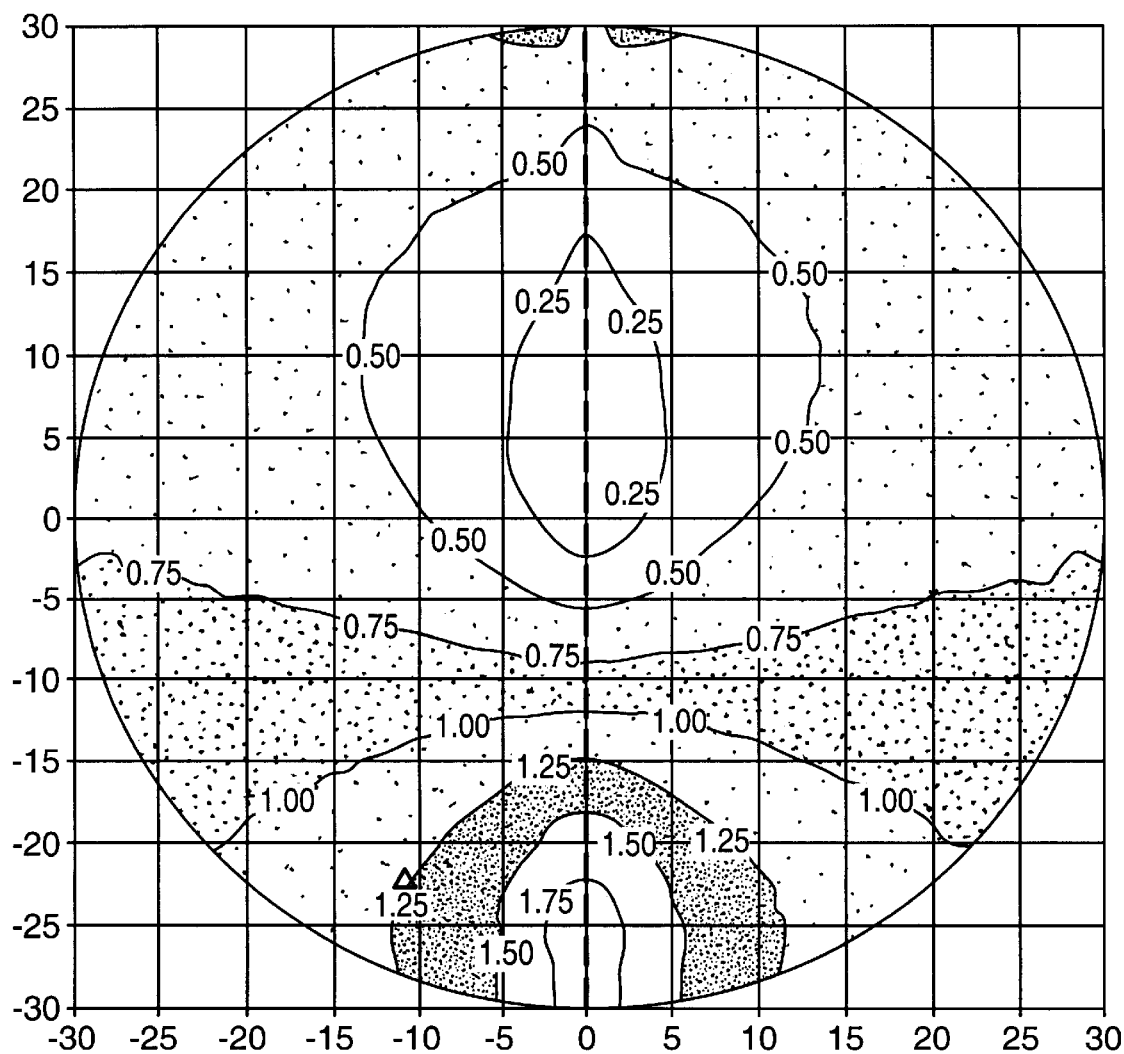
FIG. 5 is a contour map of the lens of Example 2.

A lens of the invention is provided by the procedure of Example 1 with the characteristics shown on Table 1 and the isocylinder and power maps for the lens are shown in FIGS. 4 and 5, respectively. The nominal add power of the lens is 2.00 diopters. As is shown, the lens is free of unwanted astigmatism of greater than 0.85 diopters. The channel of the lens is elongated, consistent with the need for a wide and long zone of intermediate power. The width of the far vision zone spans the entire optic. The lens is optimized for a working distance of 40 to 80 cm, which distance is typical for computer screen viewers. The weight parameters used in the algorithm emphasized reduction of astigmatism at the channel boundaries and de-emphasized the near vision zone width. The channel power gradient was 0.08 diopters/mm.

TABLE 1

| Example | Channel Length (mm) | Channel Width (mm) | Maximum Unwanted Astigmatism | Width of Near Vision Zone (mm) | Width of Far Vision Zone |
|---------|---------------------|--------------------|------------------------------|--------------------------------|--------------------------|
| 1 | 18 | 12.5 | 0.85 D | 14.5 | 20 |
| 2 | 26 | 24.0 | 0.82 D | 16.0 | Entire lens width |

Example 3

Figure 6:
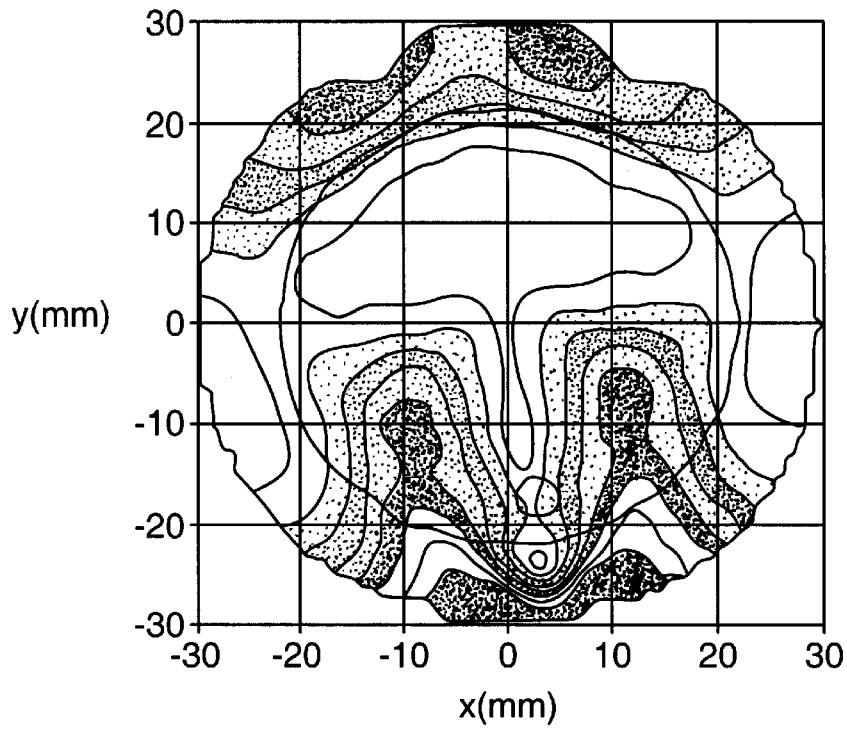
FIG. 6 is an isocylinder map of the lens of Example 3.
Figure 7:
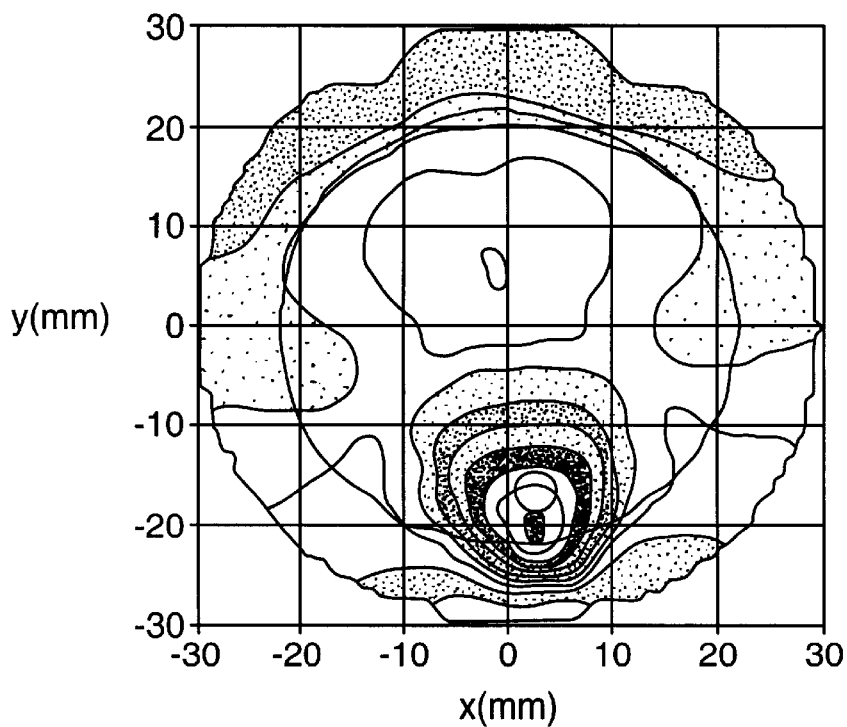
FIG. 7 is a contour map of the lens of Example 3.

A lens of the invention is provided by the procedure of Example 1 with the characteristics shown on Table 2 and the isocylinder and power maps for the lens are shown in FIGS. 6 and 7, respectively. The nominal add power of the lens is 2.00 diopters. The channel of the lens is elongated, consistent with the need for a wide and long zone of intermediate power. The width of the far vision zone spans 54 mm. The lens is optimized for a working distance of 40 to 80 cm, which distance is typical for computer screen viewers. The weight parameters used in the algorithm emphasized reduction of astigmatism at the channel boundaries and de-emphasized the near vision zone width. The channel power gradient was 0.094 diopters/mm.

Example 4

Figure 8:
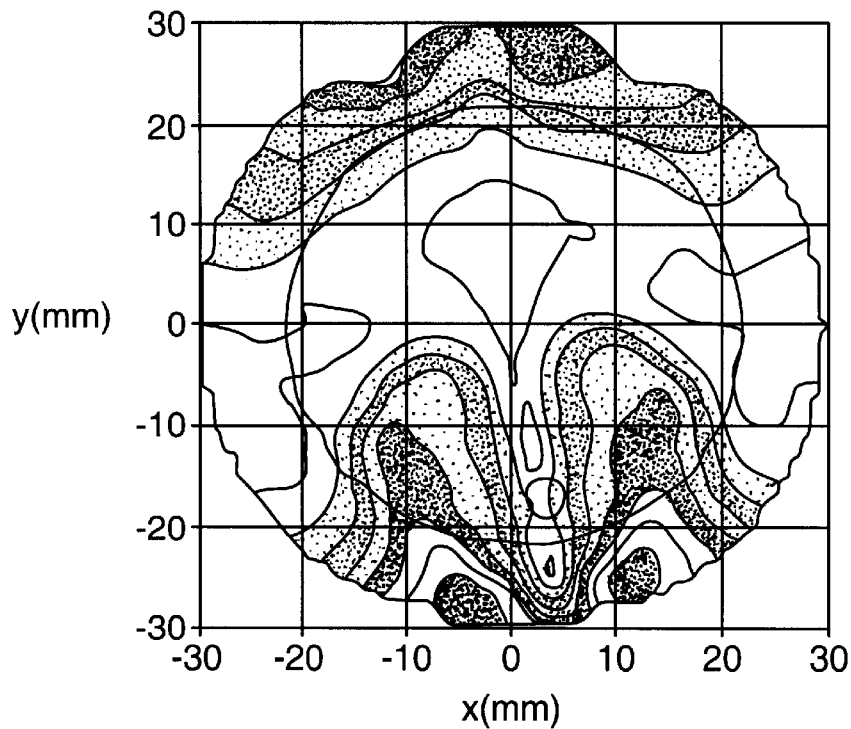
FIG. 8 is an isocylinder map of the lens of Example 4.
Figure 9:
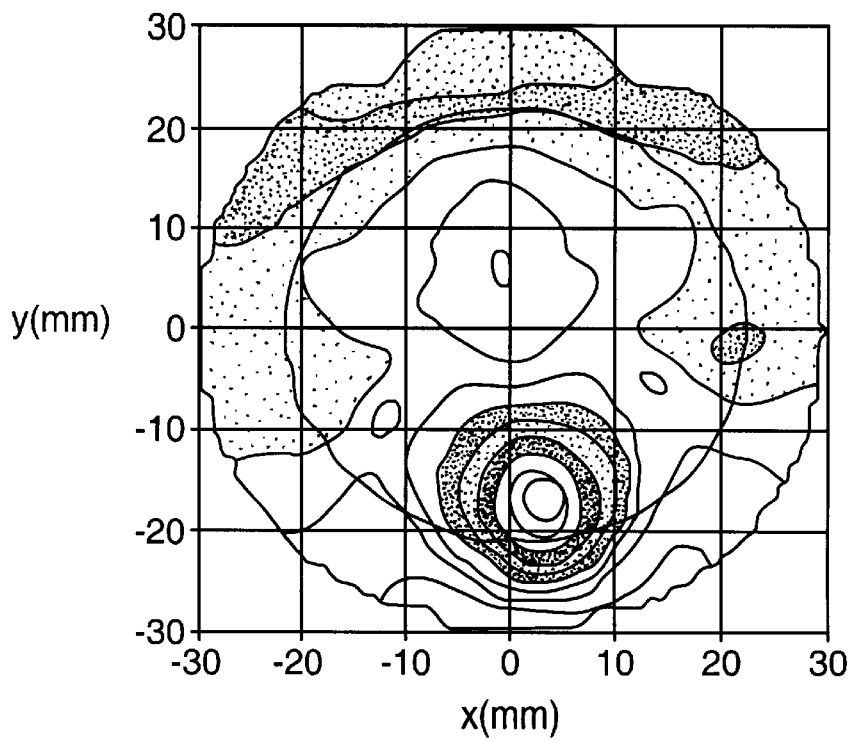
FIG. 9 is a contour map of lens of Example 4.

A lens of the invention is provided by the procedure of Example 1 with the characteristics shown on Table 2 and the isocylinder and power maps for the lens are shown in FIGS. 8 and 9, respectively. The nominal add power of the lens is 2.00 diopters. The channel of the lens is elongated, consistent with the need for a wide and long zone of intermediate power. The width of the far vision zone spans the entire optic. The lens is optimized for a working distance of 40 to 80 cm, which distance is typical for computer screen viewers. The weight parameters used in the algorithm emphasized reduction of astigmatism at the channel boundaries and de-emphasized the near vision zone width. The channel power gradient was 0.095 diopters/mm.

TABLE 2

| Example | Channel Length (mm) | Channel Width (mm) | Maximum Unwanted Astigmatism | Width of Near Vision Zone (mm) | Width of Far Vision Zone |
|---------|---------------------|--------------------|------------------------------|--------------------------------|--------------------------|
| 3 | 26.6 | 21.1 | 1.69 D | 18.1 | 54.7 |
| 4 | 25.7 | 19.7 | 1.58 D | 18.6 | 55.9 |

What is claimed is:

1. A progressive addition lens comprising at least one surface comprising a far vision zone, a near vision zone, and a channel having a length of about 19 mm or less, wherein the width of the far vision zone is about equal to or greater than the width of the channel and the width of the channel is about equal to or greater than the width of the near vision zone and wherein the lens has a maximum, unwanted astigmatism of less than about 80 percent of the dioptric add power.

2. The lens of claim 1, wherein the lens is a spectacle lens.

3. The lens of claim 1, wherein the unwanted astigmatism is about 40 to about 80 percent.

4. The lens of claim 1, wherein the width of the far vision zone is about equal to the width of the channel and the width of the channel is about equal to or greater than the width of the near vision zone.

5. The lens of claim 1, wherein the width of the far vision zone is about equal to the width of the channel and the width of the channel is about equal to the width of the near vision zone.

6. The lens of claim 1, wherein the width of the far vision zone is greater than the width of the channel and the width of the channel is about equal to or greater than the width of the near vision zone.

7. The lens of claim 1, wherein the width of the far vision zone is greater than the width of the channel and the width of the channel is greater than the width of the near vision zone.

8. A method for designing a lens, comprising the step of designing a lens having at least one progressive surface, wherein the entire progressive surface is optimized as a whole, a channel power gradient of about 0.12 diopters/mm or less is used, and the channel length is about 19 mm or less, wherein the lens is a progressive addition lens comprising at least one surface comprising a far vision zone, a near vision zone, and a channel, wherein the width of the far vision zone is about equal to or greater than the width of the channel and the width of the channel is about equal to or greater than the width of the near vision zone and wherein the lens has a maximum, unwanted astigmatism of less than about 80 percent of the dioptric add power.

* * * * *